(12) United States Patent
Kuhn

(10) Patent No.: US 8,398,303 B2
(45) Date of Patent: Mar. 19, 2013

(54) TEMPERATURE MEASURING PROBE, IN PARTICULAR FOR A HOUSEHOLD APPLIANCE

(75) Inventor: Jens Kuhn, Manebach (DE)

(73) Assignee: Miele & Cie. KG, Guetersloh (DE)

( * ) Notice: Subject to any disclaimer, the term of this patent is extended or adjusted under 35 U.S.C. 154(b) by 871 days.

(21) Appl. No.: 12/107,190

(22) Filed: Apr. 22, 2008

(65) Prior Publication Data

US 2008/0259995 A1 Oct. 23, 2008

(30) Foreign Application Priority Data

Apr. 23, 2007 (DE) .......................... 10 2007 019 403

(51) Int. Cl.
*G01K 7/34* (2006.01)
(52) U.S. Cl. ........ 374/163; 374/117; 374/184; 374/208; 374/120; 374/149; 219/712
(58) Field of Classification Search .................. 374/100, 374/120, 121, 141, 149, 208, 117–119, 163, 374/152, 184; 340/870.17; 73/146.5, 1.82; 219/712, 713
See application file for complete search history.

(56) References Cited

U.S. PATENT DOCUMENTS

| | | | | | |
|---|---|---|---|---|---|
| 3,445,849 | A | * | 5/1969 | Sanford | 343/702 |
| 3,796,959 | A | * | 3/1974 | MacKenzie et al. | 455/337 |
| 4,081,645 | A | * | 3/1978 | Javes et al. | 219/713 |
| 4,204,549 | A | * | 5/1980 | Paglione | 607/102 |
| 4,340,796 | A | | 7/1982 | Yamaguchi et al. | |
| 4,377,733 | A | * | 3/1983 | Yamaguchi et al. | 219/713 |
| 4,420,752 | A | * | 12/1983 | Davis et al. | 340/870.17 |
| 4,460,814 | A | * | 7/1984 | Diesch et al. | 219/748 |
| 4,471,193 | A | * | 9/1984 | Walter | 219/712 |
| 4,475,024 | A | * | 10/1984 | Tateda | 219/713 |
| 4,677,988 | A | * | 7/1987 | Constant et al. | 600/549 |
| 4,986,670 | A | * | 1/1991 | Uchiyama et al. | 374/117 |
| 5,520,461 | A | * | 5/1996 | Curry et al. | 374/179 |
| 6,329,655 | B1 | * | 12/2001 | Jack et al. | 250/338.1 |

(Continued)

FOREIGN PATENT DOCUMENTS

| | | |
|---|---|---|
| DE | 102004047756 A1 | 4/2006 |
| DE | 102004047757 | 4/2006 |

(Continued)

OTHER PUBLICATIONS

Shou-Qi Wang et al., "A Wireless Surface Acoustic Wave Temperature Sensor Using Langasite as Substrate Material for High-Temperature Applications", Japanese Journal of Applied Physics, vol. 42, Sep. 2003, pp. 6124-6127.

*Primary Examiner* — Gail Verbitsky
(74) *Attorney, Agent, or Firm* — Leydig, Voit & Mayer, Ltd.

(57) ABSTRACT

A temperature measuring probe with a hollow outer shell including an electrically conductive section and an electrically insulating section. A temperature sensor including a resonator is disposed in the electrically conductive section and electrically conductively connected to the electrically conductive section. An antenna including a shortened monopole is disposed in the electrically insulating section. The temperature sensor and the antenna are electrically conductively connected to each other. A respective material and respective dimension of the electrically insulating section and the antenna are matched such that an effective resistance of the antenna is approximately equal to an effective resistance of the temperature sensor in an operating frequency range of the temperature sensor.

20 Claims, 3 Drawing Sheets

U.S. PATENT DOCUMENTS

| | | | |
|---|---|---|---|
| 6,617,963 B1 * | 9/2003 | Watters et al. | 340/10.41 |
| 6,698,923 B2 * | 3/2004 | Bedetti et al. | 374/208 |
| 6,778,149 B2 * | 8/2004 | Fukae et al. | 343/895 |
| 6,806,808 B1 * | 10/2004 | Watters et al. | 340/10.41 |
| 6,813,947 B2 * | 11/2004 | Dollinger et al. | 73/432.1 |
| 7,201,099 B2 * | 4/2007 | Harris et al. | 99/342 |
| 7,262,701 B1 * | 8/2007 | Nguyen | 340/572.7 |
| 7,336,987 B2 * | 2/2008 | Laurence et al. | 600/474 |
| 7,726,184 B2 * | 6/2010 | Cook et al. | 73/146.5 |
| 2005/0211104 A1 * | 9/2005 | Harris et al. | 99/342 |
| 2006/0219705 A1 | 10/2006 | Beier et al. | |
| 2008/0220727 A1 * | 9/2008 | Albsmeier et al. | 455/73 |
| 2009/0147824 A1 * | 6/2009 | Schafer et al. | 374/183 |
| 2010/0268219 A1 * | 10/2010 | Ormsby et al. | 606/33 |
| 2010/0318078 A1 * | 12/2010 | Turovskiy et al. | 606/33 |

FOREIGN PATENT DOCUMENTS

DE      102005015028      10/2006

* cited by examiner

TEMPERATURE MEASURING PROBE, IN PARTICULAR FOR A HOUSEHOLD APPLIANCE

CROSS REFERENCE TO PRIOR RELATED APPLICATION

Priority is claimed to German patent application DE 10 2007 019 403.1, filed Apr. 23, 2007 which is hereby incorporated by reference herein.

FIELD OF THE INVENTION

The present invention relates to a temperature measuring probe having an outer shell including an electrically conductive section and an electrically insulating section.

BACKGROUND

The temperature measuring probe described in DE 10 2005 015 028 A1 has an outer shell including an electrically conductive section and an electrically insulating section. The electrically conductive section of the hollow outer shell contains at least one temperature sensor in the form of a resonator, and the electrically insulating section contains an antenna in the form of a shortened monopole. The temperature sensor and the antenna are electrically conductively connected to each other. For reasons of space, the antenna is configured as a shortened monopole. Thus, the temperature measuring probe can be made particularly compact. In order to improve the impedance matching of the shortened monopole antenna to the resonator, the antenna has a loading coil. Impedance matching is advantageous for shortened monopoles, because they generally have a very low impedance, which limits power transfer from and to the resonator.

SUMMARY OF THE INVENTION

In view of the above, in an embodiment, an aspect of the present invention is to provide a temperature measuring probe that provides improved impedance matching of the shortened monopole antenna to the temperature sensor, which is in the form of a resonator.

In an embodiment, the invention provides a temperature measuring probe with a hollow outer shell including an electrically conductive section and an electrically insulating section. A temperature sensor including a resonator is disposed in the electrically conductive section and electrically conductively connected to the electrically conductive section. An antenna including a shortened monopole is disposed in the electrically insulating section. The temperature sensor and the antenna are electrically conductively connected to each other. A respective material and respective dimension of the electrically insulating section and the antenna are matched such that an effective resistance of the antenna is approximately equal to an effective resistance of the temperature sensor in an operating frequency range of the temperature sensor.

BRIEF DESCRIPTION OF THE DRAWINGS

An exemplary embodiment of the present invention is described in detail in the following and schematically shown in the drawings, in which.

DETAILED DESCRIPTION

Figure 1:
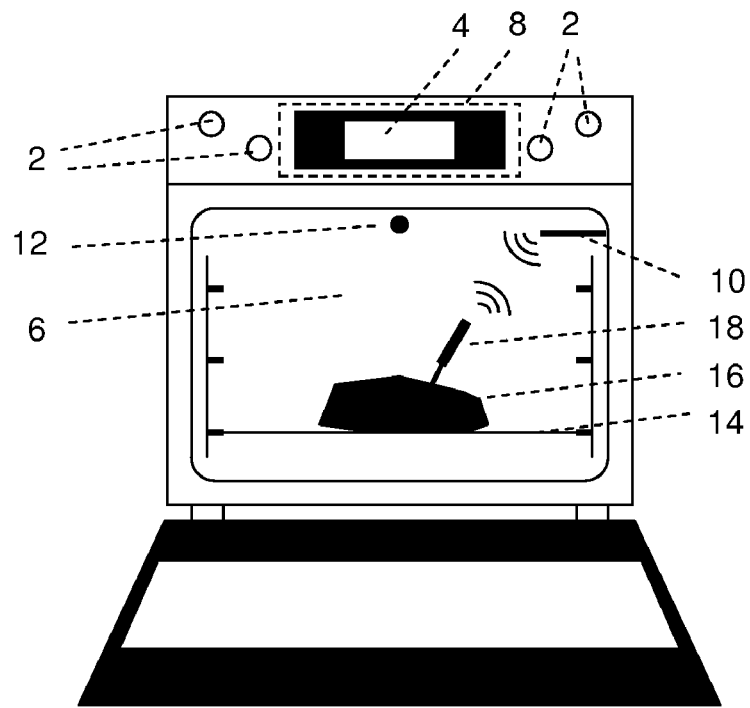
FIG. 1 shows a side view of a cooking appliance having a temperature measuring probe according to the present invention.

In an embodiment, the present invention provides improved impedance matching of the shortened monopole antenna to the resonator.

This permits a compact antenna configuration, which allows the temperature measuring probe to be constructed in a space-efficient manner. The arrangement according to an embodiment of the present invention allows impedance matching to be accomplished by using the top load capacitance in a controlled and reproducible manner. The top load capacitance is created between the tip of the antenna and the electrically conductive section of the outer shell and a suitably selected dielectric disposed therebetween. Here, the electrically insulating section of the outer shell serves as the dielectric. The material and dimensions of the antenna and of the electrically insulating section of the outer shell can be matched in such a way that the effective resistance is approximately equal to that of the resonator-type temperature sensor of the temperature measuring probe in its operating frequency range.

The type and material of the outer shell of the temperature measuring probe can, in principle, be selected within wide practical limits. In a particular embodiment, the electrically conductive section is made of a metallic material, and the electrically insulating section is made of a non-metallic material.

In a refinement of the aforementioned embodiment, the electrically insulating section is formed as a plastic handle. This enhances the functionality of this section of the exterior shell. There is no need for an additional handle.

According to another refinement of the aforementioned embodiment, the handle can include a core made of a high-strength plastic material and a coating made of a highly flexible plastic material. This gives the handle high strength and, at the same time, good tactile properties. Moreover, the rigid core prevents unwanted deformation of the softer coating.

In one embodiment, the electrical connection of the temperature sensor to the antenna and to the electrically conductive section of the outer shell is provided by a coaxial line, the inner conductor of said coaxial line connecting the temperature sensor to the antenna, and the outer conductor connecting it to the electrically conductive section. This provides a particularly simple and economical electrical interconnection of the individual components. This is especially true for the electrical connection between the temperature sensor and the electrically conductive section of the outer shell, because the temperature sensor may be disposed within the temperature measuring probe at a location that is difficult to access. Moreover, using a coaxial line ensures good reproducibility of the impedance matching. If there were a direct galvanic connection between the temperature sensor and the electrically conductive section of the outer shell, the capacitance between the electrically conductive connection between the antenna and the temperature sensor and the electrically conductive section of the outer shell could vary due to changes in the relative position of said components. In accordance with an embodiment of the present invention, this is effectively prevented by using a coaxial line. In many applications, the effective resistance of the resonator is about 50 ohms. The fact that conventional coaxial lines also have an effective resistance of 50 ohms is another reason why it is advantageous to use coaxial lines.

In a refinement of the aforementioned embodiment, the electrical connection between the outer conductor of the coaxial line and the electrically conductive section of the outer shell can be located in the area of contact between the electrically conductive section and the electrically insulating section. This may improve access to the point of electrical contact between the outer conductor and the electrically conductive section. This is especially true for a two-part outer shell having two sections which are separably connected to one another.

In another embodiment, the interior cavity of the electrically insulating section accommodating the antenna can be evacuated or filled with inert gas, at least in the region of the antenna. This provides the thermal isolation of the antenna, which allows the temperature measuring probe to be used even in applications involving high ambient temperatures.

FIG. 1 shows an appliance in the form of a baking oven. The baking oven has control elements 2 and a display device 4, an oven chamber 6, and an electrical processing unit 8 symbolized by a dashed line. Control elements 2 and display device 4 are connected in signal communication with electrical processing unit 8 in a manner known to those skilled in the art. The same applies to a cooking chamber antenna 10 located in oven chamber 6 and an electrical heater 12, which is also disposed in oven chamber 6.

The food to be cooked 16 is placed on a food-supporting member 14 and inserted in oven chamber 6, said food being in the form of a piece of meat and pierced with a temperature measuring probe 18 in the form of a cooking skewer. The design of temperature measuring probe 18 is explained in more detail with reference to FIGS. 2 and 3. The type, material, size and arrangement of temperature measuring probe 18 can, in principle, be selected within wide practical limits.

Temperature measuring probe 18 is in signal communication with electrical processing unit 8 via cooking chamber antenna 10 in a manner known to those skilled in the art.

Figure 2:
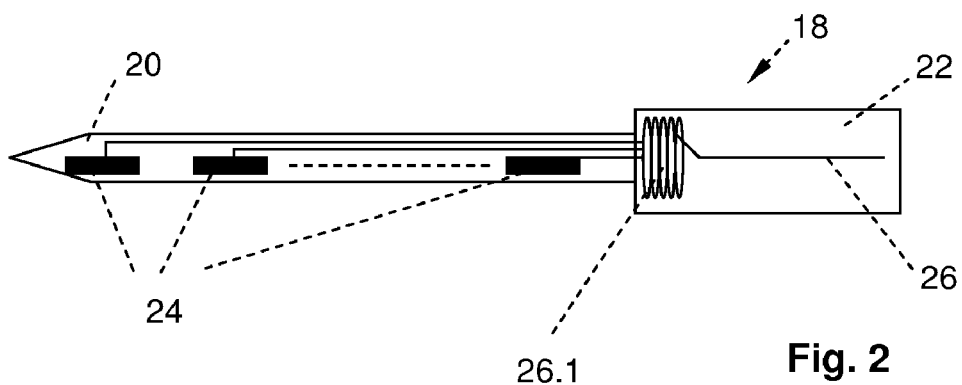
FIG. 2 shows a cross-sectional view of the temperature measuring probe of FIG. 1.

FIG. 2 is a simplified representation of temperature measuring probe 18. Temperature measuring probe 18 includes an electrically conductive section 20 in the form of a skewer and an electrically insulating section 22 in the form of a handle. Skewer 20 has a plurality of temperature sensors in the form of surface wave devices 24 therein. However, it is also possible to use a temperature measuring probe having only one temperature sensor 24. The number of temperature sensors 24 depends on the particular application. The surface wave devices 24 used in the present embodiment are only examples of resonators. Alternatively, it is possible to use other suitable types of resonators known to those skilled in the art. Surface wave devices 24 are selected such that the temperature-dependent resonant frequencies corresponding to the temperatures expected at temperature measuring probe 18 during operation of the household appliance are contained in the frequency band from about 433 MHz to about 434 MHz, which is selected for the present exemplary embodiment. The individual surface wave devices 24 are electrically conductively connected, in a manner known to those skilled in the art, to an antenna 26 which is in the form of a shortened monopole and is disposed in handle 22. In order to make antenna 26 as space-efficient as possible, a portion thereof can be designed as a loading coil 26.1.

Figure 3:
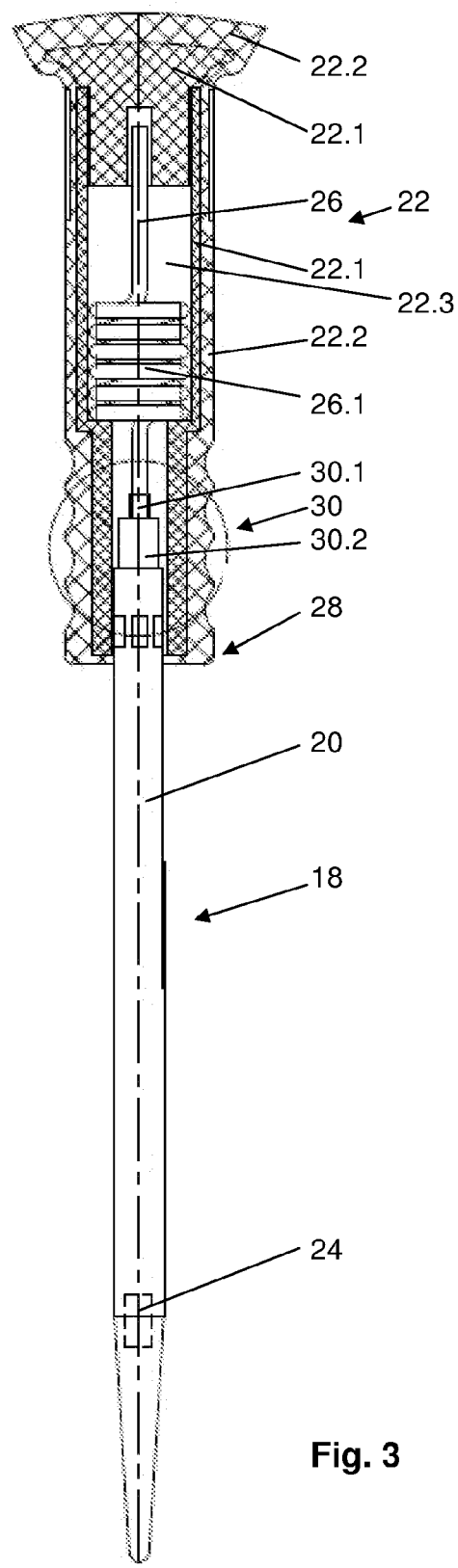
FIG. 3 shows an enlarged partially cross-sectional view of the temperature measuring probe of FIG. 2.

The design of temperature measuring probe 18 is explained in more detail with reference to FIG. 3. For the sake of simplicity, the description is given with reference to one surface wave device 24 only, but applies equally to the other surface wave devices 24.

Electrically conductive section 20, which is in the form of a skewer and is made of metal, for example stainless steel, and the electrically insulating section 22, which is in the form of a handle and is made of plastic, together form a liquid-tight outer shell 28. As can be seen from FIG. 3, outer shell 28 is a two-part construction, skewer 20 and handle 22 each forming a part of the outer shell, these parts being separably connected to one another in a manner known to those skilled in the art. It would also be possible for the two sections 20 and 22 to be permanently joined together, such as by adhesive bonding.

Handle 22 includes a core 22.1 made of a high-strength plastic material, here polyphenylene sulfide (PPS), and a coating 22.2 made of a highly flexible plastic material, here silicone. In the present exemplary embodiment, due to the high temperatures in this application, the plastics used can be sufficiently heat resistant. However, it is, in principle, also possible to use other suitable dielectrics known to those skilled in the art. As an alternative to the aforementioned two-part construction of electrically insulating section 22, it could also be formed as a single piece such as, for example, a handle made of a single electrical insulator.

Outer shell 28 is hollow inside. Antenna 26, which is configured as a shortened monopole, additionally has a loading coil 26.1 which is used for impedance matching and is disposed entirely inside handle 22. To improve the thermal isolation of antenna 26, especially for use in high temperature applications, it is also possible to additionally evacuate the cavity 22.3 remaining in handle 22, or to fill it with inert gas.

Antenna 26 is electrically conductively connected via inner conductor 30.1 of a coaxial line 30 to the temperature sensor 24 located in the tip of skewer 20. Temperature sensor 24 is here indicated simply by a dashed line. For improved heat transfer, temperature sensor 24 is heat-conductively connected to electrically conductive section 20 of outer shell 28 by a heat-conducting paste. Moreover, temperature sensor 24 is electrically conductively connected via outer conductor 30.2 of coaxial line 30 to electrically conductive section 20. In order to facilitate the use and installation of temperature measuring probe 18, outer conductor 30.2 is electrically conductively connected to electrically conductive section 20 in the area of contact between the two sections 20 and 22 of outer shell 28. The contact area is indicated in FIG. 3 by a circle.

Figure 4:
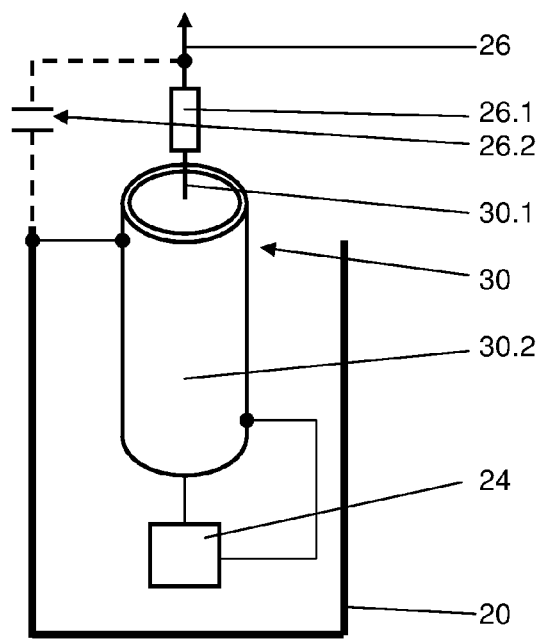
FIG. 4 shows a rough schematic view of the electrical interconnections between the individual components of the temperature measuring probe.
Figure 5:
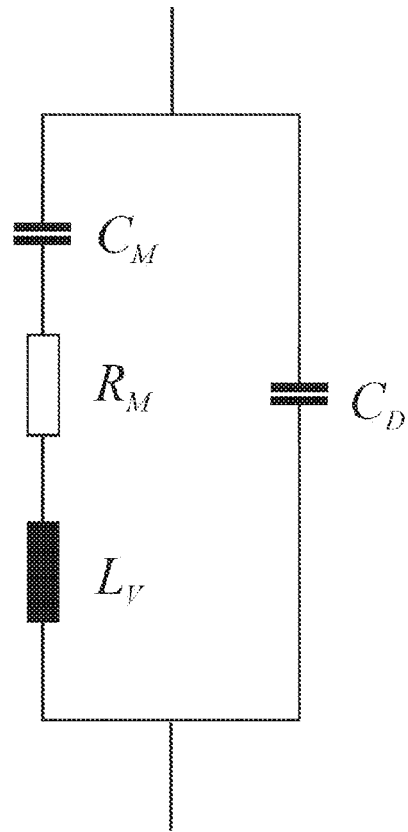
FIG. 5 shows an equivalent electrical circuit diagram of the antenna shown in FIG. 4.

The aforementioned electrical interconnections between the individual components of temperature measuring probe 18 are schematically shown in FIG. 4. An equivalent electrical circuit diagram of antenna 26 is shown in FIG. 5, where $C_M$ is the capacitance of the monopole, $R_M$ is the effective resistance of the shortened monopole, $L_V$ is the inductance of loading coil 26.1, and $C_D$ is the top load capacitance 26.2 between the tip of antenna 26 and the reference plane, here the electrically conductive section 20, which is shorted to the outer conductor 30.2 of coaxial line 30. In FIG. 4, top load capacitance 26.2 is merely symbolized by dashed lines, because it is not a real component, such as an additional capacitor.

By suitably matching the materials and the dimensions of antenna 26 and electrically insulating section 22 (here handle 22 including core 22.1 and coating 22.2), the impedance matching of shortened monopole antenna 26 to temperature sensor 24, which is in the form of a resonator (here specifically a surface wave device 24), can be improved without additional components.

The mathematical relationship of this is generally known and is expressed by the formula:

$$Z_A(\mathrm{Re}) = \frac{R_M}{R_M^2 * \varpi^2 * C_D^2 + \left(\varpi^2 * L_V * C_D - \frac{C_D}{C_M} - 1\right)^2}$$

where $Z_A(\mathrm{Re})$ is the real part of the antenna impedance, i.e. the effective resistance in the operating frequency range ω of the temperatures sensor, i.e., of the resonator. Good impedance matching is obtained when the effective resistance $Z_A(\mathrm{Re})$ of antenna 26 is approximately equal to that of the temperature sensor in its operating frequency range ω.

The resonator used here as a temperature sensor, i.e., surface wave device 24, has an effective resistance of 50 ohms. Although this is a common value for commercial resonators, it is alternatively conceivable to use other effective resistances. Since effective resistance $Z_A(\mathrm{Re})$ of shortened monopole antenna 26 without loading coil 26.1 is generally significantly smaller than 50 ohms, said effective resistance must be increased. In accordance with the formula above, this is achieved, in particular, when the denominator of the formula becomes less than 1. Given the usual values for the involved components described earlier herein, this is achieved mainly by increasing the quotient $C_D/C_M$. The aforementioned quotient can be influenced in a targeted manner by means of electrically insulating section 22, namely by the selection of the material, and thus of the dielectric constant, and of the dimensions of electrically insulating section 22, which provides a simple way of matching the impedance of antenna 26 to the effective resistance of resonator 24.

In a temperature measuring probe designed according to the present invention, this can be accomplished by matching the antenna and the electrically insulating section 22 in terms of dimensions and material, without the need for additional components, such as capacitors to provide top load capacitance 26.2, or electrical circuits. The electrically conductive connection between temperature sensor 24 and outer shell 28 ensures that the top load capacitance 26.2 of the inventive temperature measuring probe 18 remains reproducible and thus calculable. If there were no such electrical connection, top load capacitance 26.2 would be created between the tip of antenna 26 and any electrically conductive component of the household appliance, and would therefore not be reproducible.

Therefore, it is particularly advantageous to use outer shell 28, and specifically electrically insulating section 22, for impedance matching of shortened monopole antenna 26.

The present invention is not limited to the exemplary embodiment described herein. For example, the temperature measuring probe of the present invention is not limited to use in baking ovens or household appliance, but may be used in all applications where temperature measurement is required.

What is claimed is:

1. A temperature measuring probe comprising:
   a hollow outer shell including an electrically conductive section and an electrically insulating section;
   a temperature sensor disposed in the electrically conductive section and electrically conductively connected to the electrically conductive section, the temperature sensor including a resonator; and
   an antenna disposed in the electrically insulating section, the antenna including a shortened monopole;
   wherein the temperature sensor and the antenna are electrically conductively connected to each other, a top load capacitance being formed between a tip of the antenna and the electrically conductive section of the outer shell, the tip of the antenna and the electrically conductive section forming electrodes of the top load capacitance and the insulating section forming the dielectric of the top load capacitance, and
   wherein a respective material and respective dimension of the electrically insulating section and the antenna are matched based at least in part on the top load capacitance such that an effective resistance of the antenna is approximately equal to an effective resistance of the temperature sensor in an operating frequency range of the temperature sensor so as to provide impedance matching.

2. The temperature measuring probe as recited in claim 1, wherein the electrically conductive section includes a metallic material, and the electrically insulating section includes a non-metallic material.

3. The temperature measuring probe as recited in claim 2, wherein the electrically insulating section includes a plastic handle.

4. The temperature measuring probe as recited in claim 3, wherein the electrically insulating section includes a cavity.

5. The temperature measuring probe as recited in claim 3, wherein the handle includes a core comprising a stiff plastic material and a coating comprising a flexible plastic material.

6. The temperature measuring probe as recited in claim 4, wherein the handle includes a core comprising a stiff plastic material and a coating comprising a flexible plastic material.

7. The temperature measuring probe as recited in claim 1 wherein the antenna includes a loading coil.

8. The temperature measuring probe as recited in claim 2 wherein the antenna includes a loading coil.

9. The temperature measuring probe as recited in claim 3 wherein the antenna includes a loading coil.

10. The temperature measuring probe as recited in claim 4 wherein the antenna includes a loading coil.

11. The temperature measuring probe as recited in claim 5 wherein the antenna includes a loading coil.

12. The temperature measuring probe as recited in claim 6 wherein the antenna includes a loading coil.

13. A temperature measuring probe comprising:
    a hollow outer shell including an electrically conductive section and an electrically insulating section;
    a temperature sensor disposed in the electrically conductive section and electrically conductively connected to the electrically conductive section, the temperature sensor including a resonator; and
    an antenna disposed in the electrically insulating section, the antenna including a shortened monopole;
    wherein the temperature sensor and the antenna are electrically conductively connected to each other, and wherein a respective material and respective dimension of the electrically insulating section and the antenna are matched such that an effective resistance of the antenna is approximately equal to an effective resistance of the temperature sensor in an operating frequency range of the temperature sensor,
    wherein an electrical connection between the temperature sensor and the antenna and the electrically conductive section of the outer shell includes a coaxial line, an inner conductor of the coaxial line connecting the temperature sensor to the antenna, and an outer conductor of the coaxial line connecting the temperature sensor to the electrically conductive section of the outer shell.

14. The temperature measuring probe as recited in claim 2, wherein an electrical connection between the temperature sensor and the antenna and the electrically conductive section of the outer shell includes a coaxial line, an inner conductor of the coaxial line connecting the temperature sensor to the antenna, and an outer conductor of the coaxial line connecting the temperature sensor to the electrically conductive section of the outer shell.

15. The temperature measuring probe as recited in claim 13, wherein the electrical connection between the outer conductor of the coaxial line and the electrically conductive section of the outer shell is disposed in an area of contact between the electrically conductive section and the electrically insulating section of the outer shell.

16. The temperature measuring probe as recited in claim 7, wherein an electrical connection between the temperature sensor and the antenna and the electrically conductive section of the outer shell includes a coaxial line, an inner conductor of the coaxial line connecting the temperature sensor to the antenna, and an outer conductor of the coaxial line connecting the temperature sensor to the electrically conductive section of the outer shell.

17. The temperature measuring probe as recited in claim 16, wherein the electrical connection between the outer conductor of the coaxial line and the electrically conductive section of the outer shell is disposed in an area of contact between the electrically conductive section and the electrically insulating section of the outer shell.

18. The temperature measuring probe as recited in claim 4 wherein the antenna is disposed in an area of the cavity of the electrically insulating section, the area of the cavity being evacuated or filled with inert gas.

19. The temperature measuring probe as recited in claim 6 wherein the antenna is disposed in an area of the cavity of the electrically insulating section, the area of the cavity being evacuated or filled with inert gas.

20. A household appliance including a temperature measuring probe comprising:
 a hollow outer shell including an electrically conductive section and an electrically insulating section;
 a temperature sensor disposed in the electrically conductive section and electrically conductively connected to the electrically conductive section, the temperature sensor including a resonator; and
 an antenna disposed in the electrically insulating section, the antenna including a shortened monopole;
 wherein the temperature sensor and the antenna are electrically conductively connected to each other, a top load capacitance being formed between a tip of the antenna and the electrically conductive section of the outer shell, the tip of the antenna and the electrically conductive section forming electrodes of the top load capacitance and the insulating section forming the dielectric of the top load capacitance, and
 wherein a respective material and respective dimension of the electrically insulating section and the antenna are matched based at least in part on the top load capacitance such that an effective resistance of the antenna is approximately equal to an effective resistance of the temperature sensor in an operating frequency range of the temperature sensor so as to provide impedance matching.

* * * * *